United States Patent [19]

Confer

[11] 4,210,503
[45] Jul. 1, 1980

[54] EMISSION CONTROL METHOD AND SYSTEM

[75] Inventor: Robert G. Confer, Colonia, N.J.

[73] Assignee: Exxon Research & Engineering Co., Florham Park, N.J.

[21] Appl. No.: 645,810

[22] Filed: Dec. 31, 1975

[51] Int. Cl.² .............................. B01J 1/00; B01J 1/10
[52] U.S. Cl. ........................ 204/158 R; 204/157.1 R; 250/527
[58] Field of Search .................... 204/157.1 R, 158 R; 250/527

[56] References Cited

U.S. PATENT DOCUMENTS

| | | | |
|---|---|---|---|
| 3,201,337 | 8/1965 | Eichelberger et al. | 204/157.1 R |
| 3,657,087 | 4/1972 | Scott | 204/158 R |
| 3,869,362 | 3/1975 | Machi et al. | 204/157.1 R |
| 3,977,952 | 8/1976 | Knoevenagel et al. | 204/158 R |
| 4,045,316 | 8/1977 | Legan | 204/158 R |

Primary Examiner—Howard S. Williams
Attorney, Agent, or Firm—F. Donald Paris

[57] ABSTRACT

A method and system for controlling plant and other gaseous emissions from processes and stacks by decomposing predetermined components, particularly vinyl chloride, of these emissions by exposure to ultraviolet radiation to form less hazardous materials which then are absorbed in a scrubber. This results in the substantial elimination of vinyl chloride and most of the other decomposition products from being ejected into the atmosphere.

10 Claims, 1 Drawing Figure

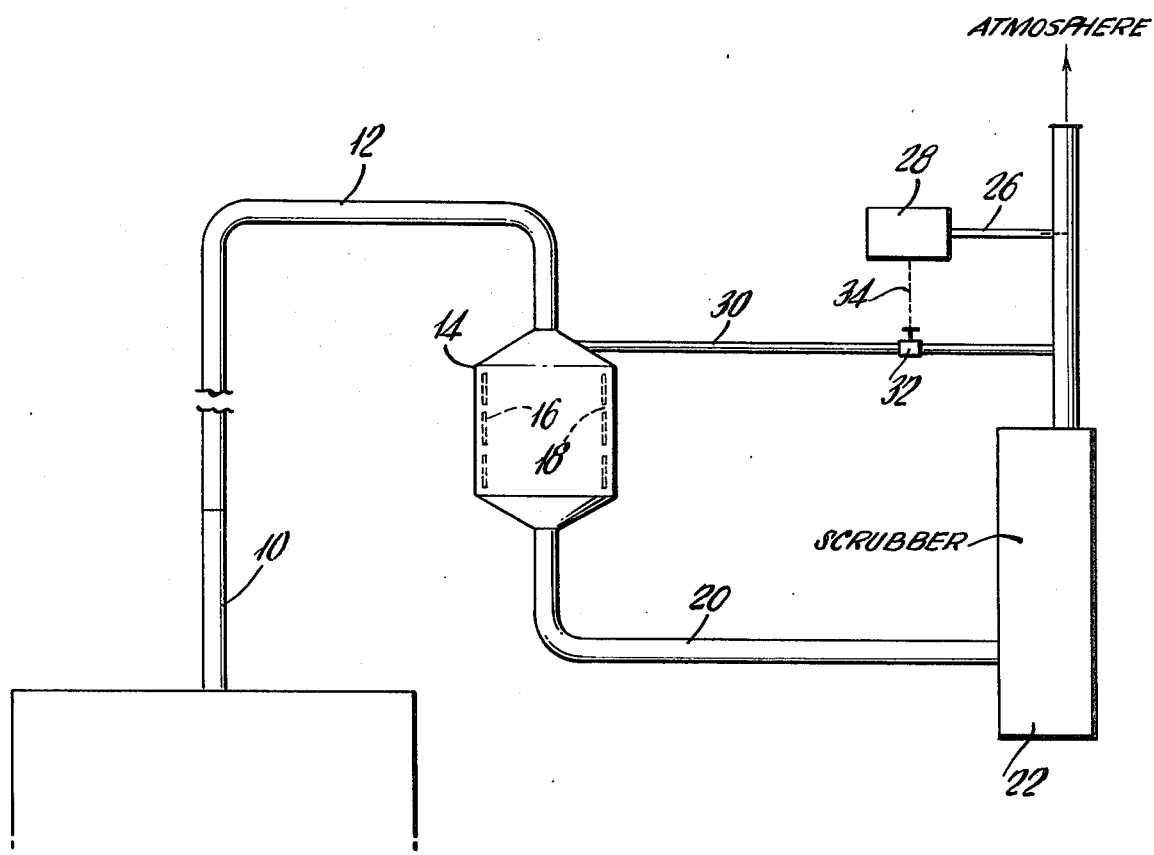

EMISSION CONTROL METHOD AND SYSTEM

CROSS-REFERENCE TO RELATED APPLICATIONS

Copending application U.S. Ser. No. 507,775, filed September 20, 1974, now U.S. Pat. No. 3,997,416, assigned to the assignee of the present application, discloses a method and apparatus for analyzing gaseous mixtures including measurement of small concentrations of vinyl chloride.

BACKGROUND OF THE INVENTION

Concern with the health hazards associated with industrial exposure to materials, in particular vinyl chloride, has caused the allowable concentration of vinyl chloride to be reduced substantially from the previous standards to levels in air of one part vinyl chloride to every million parts of air, averaged over an eight-hour period. Levels of vinyl chloride in the atmosphere may exceed one part per million for short periods; however, it must average no more than five parts per million for any fifteen minute period over an eight-hour span.

Various methods for reducing vinyl chloride emissions from PVC manufacturing and fabrication plants have been proposed. These include the adsorption of the vinyl chloride monomer from vent gases on activated charcoal with the monomer regenerated with steam and the vinyl chloride re-introduced into the process. Other control techniques include thermal decomposition of the monomer or solvent scrubbing.

SUMMARY OF THE INVENTION

The invention relates to a method and system for controlling gaseous emissions, and particularly vinyl chloride, by exposing such emissions to ultraviolet light of sufficient intensity to decompose certain components of interest into other materials and, thereafter, absorbing such decomposition products in a scrubber which substantially eliminates the vinyl chloride and most other decomposition products from being exhausted to the atmosphere.

As specifically applied to the control of plant emissions from processes and stacks, the emissions are passed through a chamber where it is exposed to ultraviolet light of adequate intensity so as to decompose essentially all of the vinyl chloride present. The resulting decomposition products consist primarily of hydrogen chloride with trace amounts of phosgene and chlorine. Thereafter, the decomposed products are passed through apparatus such as a water scrubber, which absorbs the products of decomposition, thereby eliminating them from subsequently being released to the atmosphere.

The invention also may be applied to a number of other compounds, e.g. nitric oxide, hydrogen sulfide, and carbon disulfide, which are contained in gaseous emissions. The compounds are limited only by their tendency to decompose when exposed to ultraviolet light and on the ability to remove them in apparatus, subsequent to exposure to the ultraviolet and prior to exhaust to the atmosphere.

BRIEF DESCRIPTION OF THE DRAWINGS

The single FIGURE is a schematic diagram illustrating the invention in a typical exhaust system for plant emission control.

DESCRIPTION OF THE PREFERRED EMBODIMENT

Although the invention relates in a preferred embodiment to the control of vinyl chloride in plant emissions, it also is applicable to other potentially hazardous materials which are desired to be prevented from exhaust to the atmosphere. The description which follows, however, will be primarily directed to the control of vinyl chloride.

Oftentimes, as in polyvinyl chloride manufacturing operations and other plant processes such as PVC fabrication, vinyl chloride will be a principal compound contained in the emissions to the atmosphere. As illustrated in the single FIGURE, there is shown a typical exhaust stack 10 which emits a gaseous mixture from a plant process operation. The mixture is coupled through a conduit 12 connected at an end to the emission stack and at its opposite end to a plenum chamber 14. The chamber 14 preferably is made of stainless steel, although other materials such as fiberglass or carbon steel also can be used, as long as it is substantially corrosion-resistant. A bank of ultraviolet lights 16 and 18 are situated about or on opposite sides of the chamber, such that the gaseous mixture flows through the ultraviolet lights, which emit an intense ultraviolet radiation of sufficient intensity to convert essentially all of the vinyl chloride to decomposition products which include hydrogen chloride and traces of phosgene. A range of ultraviolet radiation intensity typically may be 3 to 6 watts/liter of plenum volume with a preferred range being 3 to 5 watts/liter, and most preferably 4 watts/liter. Suitable ultraviolet radiation may be provided by lamps which emit ultraviolet light. The volume of the chamber is such that the residence time of the exhaust stream in the chamber is about thirty seconds, although the residence period can vary from 20 to 50 seconds depending on the intensity of the ultraviolet light. The criteria for selecting the residence time for a particular operation is based on effective decomposition of containment. The exposure to the ultraviolet radiation will also decompose other components typically contained in plant emission, such as carbon disulfide, hydrogen sulfide, nitric oxide, and other airborne contaminants which can be decomposed by exposure to intense ultraviolet radiation. For example, nitric oxide may be oxidized to nitrogen dioxide by exposure to ultraviolet radiation, which then is absorbed in the scrubber. In another example hydrogen sulfide can be decomposed to sulfur dioxide which can be absorbed in the scrubber.

A conduit 20 is connected at one end to the outlet of the decomposition chamber 14 which contains the ultraviolet lights and at its opposite end to apparatus schematically shown at 22 which in the preferred embodiment comprises a water scrubber. The water may be deionized for best effectiveness or regular tap water also will sulfide. The scrubber per se may be of the conventional type, e.g. venturi type. Alternatively, it may be of the spray chamber type. The gaseous stream containing the decomposition products is transferred via conduit 20 into the scrubber 22 where the decomposition products, particularly the hydrogen chloride, are absorbed. Almost ninety percent decomposition of the vinyl chloride has been obtained in the laboratory, with vinyl chloride concentrations in the input gaseous stream of from 0.1 to 25 parts per million.

The resultant gaseous stream after passing through the scrubber 22 then is exhausted to the atmosphere by means of an exhaust conduit 24. This exhaust will be substantially free of vinyl chloride or at the very least will have reduced the vinyl chloride concentration to an acceptable level. This level can be monitored by sampling the exhaust flowing through conduit 24 by use of the invention of the aforementioned U.S. Pat. No. 3,997,416, by means of extracting a sample via tube 26 and analyzing it as schematically shown at 28. If the measured level of vinyl chloride concentration exceeds a predetermined level, the exhaust can be recycled through a feedback conduit 30 for repassage through the ultraviolet light plenum 14. The recycled exhaust can be fed back directly into the ultraviolet light plenum as shown for recycling with the flow from conduit 12. Also, an automatically controlled valve (normally closed) 32 responsive to the measured level of exhaust can be opened if the level exceeds the predetermined value to permit recycling of the exhaust in response to an appropriate signal (e.g. electrical) provided via connection 34 from the analyzer 28 to the valve 32. The valve, which is per se conventional, would remain closed at levels below the predetermined reference level. Other alternatives may include use of a signal from the stack monitoring sensor 28 to actuate a mechanical blower (not shown) to supply air to the stack to reduce the level of vinyl chloride in the exhaust air to an acceptable level.

While a preferred embodiment and various modifications thereof have been disclosed, it will be apparent to those of ordinary skill in the art upon reading this disclosure, that other modifications and variations can be made. Accordingly, reference should be made to the appended claims for determining the full and complete scope of the present invention.

What is claimed is:

1. A method for controlling gaseous emissions exhausted to the atmosphere from a process, comprising the steps of:
   (a) passing said gaseous emissions through a decomposition chamber having a predetermined volume;
   (b) exposing said gaseous emissions in said chamber to ultraviolet radiation of sufficient intensity by passage of said emissions through said ultraviolet radiation to decompose predetermined components of said emissions including vinyl chloride which is decomposed into at least hydrogen chloride, wherein said predetermined volume of said decomposition chamber affords adequate residence time for said gaseous emissions to decompose;
   (c) passing the decomposition products including hydrogen chloride from step (b) through an absorption medium wherein said products including at least said hydrogen chloride are absorbed; and
   (d) exhausting said gaseous emissions after step (c) to the atmosphere with an acceptable level of vinyl chloride contained therein.

2. The method of claim 1 wherein said gaseous emissions include hydrogen chloride and phosgene as the components to be absorbed in step (c).

3. The method of claim 1 wherein said ultraviolet radiation has an intensity in the range of 3 to 6 watts per liter of chamber volume.

4. The method of claim 1 wherein said gaseous emissions are exposed for a period of about thirty seconds to said ultraviolet radiation in said chamber.

5. The method of claim 1 wherein said decomposition products are absorbed in deionized water or normal tap water.

6. The method of claim 1 including the step of recycling said gaseous emissions from (d) through said chamber when said level of vinyl chloride exceeds a predetermined amount.

7. The method of claim 1 including the step of further reducing the level of vinyl chloride in said gaseous emissions exhausted to the atmosphere if said level exceeds a predetermined amount.

8. The method of claim 1 wherein said gaseous emissions are exposed to said ultraviolet radiation in said chamber for a period of 20 to 50 seconds.

9. A method for controlling gaseous emissions from a process prior to their being exhausted to the atmosphere, comprising the steps of:
   (a) passing said gaseous emissions through a decomposition chamber having a predetermined volume which affords a residence time of substantially 20 to 50 seconds for said emissions within said chamber; and
   (b) exposing said gaseous emissions in said chamber to ultraviolet radiation of sufficient intensity by passage of said emissions through said ultraviolet radiation for decomposing predetermined components of said emissions including vinyl chloride which is decomposed into at least hydrogen chloride during said period of residence within said chamber.

10. An apparatus for controlling gaseous emissions, comprising:
   (a) means for transfering said emissions to a decomposition chamber of predetermined volume, said predetermined volume affording sufficient residence time within said chamber for enabling said gaseous emissions to decompose predetermined components thereof;
   (b) ultraviolet radiating means in said chamber for coaction with said emissions for decomposing said predetermined components in said emissions into decomposition products as they pass through ultraviolet radiation emitted from said ultraviolet radiating means;
   (c) absorption means for receiving the emissions including the decomposition products produced by said ultraviolet radiating means and absorbing said products;
   (d) means for exhausting said emissions after passage through said absorption means to the atmosphere; and
   (e) means including valve means responsive to the measured level of at least vinyl chloride for recycling said emissions from said exhausting means if said emissions exceed a predetermined level of contaminant.

* * * * *